United States Patent
Mamalis

[15] 3,666,757
[45] May 30, 1972

[54] DI-HYDRO-S-TRIAZINES

[72] Inventor: Patrick Mamalis, Reigate, England

[73] Assignee: Beecham Group Limited, Brentford, England

[22] Filed: Dec. 5, 1969

[21] Appl. No.: 882,724

[30] Foreign Application Priority Data

Dec. 20, 1968 Great Britain.....................60,848/69

[52] U.S. Cl............................................260/249.9, 424/249
[51] Int. Cl. ..........................................................C07d 55/20
[58] Field of Search................................................260/249.9

[56] References Cited

UNITED STATES PATENTS

| | | | |
|---|---|---|---|
| 2,976,288 | 3/1961 | Green et al. | 260/249.9 |
| 3,105,074 | 9/1963 | Mamalis | 260/249.9 |

Primary Examiner—John M. Ford
Attorney—Jacobs & Jacobs

[57] ABSTRACT

Anti-malarial and anti-bacterial compounds and compositions are provided which are N-substituted symmetrical dihydro triazines or salts represented by 4,6-diamino-1,2-dihydro-2,2-dimethyl-1-(2-ethoxy-5-chlorobenzyloxy)-1,3,5-triazine hydrochloride. The compounds can be prepared by reacting a substituted diguanide with a carbonyl compound in the presence of a strong acid and then salifying or acylating the reaction product.

9 Claims, No Drawings

DI-HYDRO-S-TRIAZINES

This invention relates to N-substituted symmetrical dihydro triazine derivatives and to processes for making them. Compounds within the scope of the present invention have anti-microbial activity of various kinds.

Accordingly the present invention provides novel substituted triazines of general formula

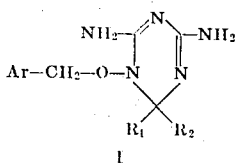

where
Ar is:
an aryl ring system which is substituted by at least one alkoxy group of one – 24 carbon atoms and at least one halogen atom or which is substituted by at least one halogenoloweralkyl group of one – six carbon atoms,
$R_1$ is:
hydrogen or lower alkyl of one – four carbon atoms
$R_2$ is:
lower alkyl of one – four carbon atoms where $R_1$ and $R_2$ may be the same or different and may be joined to each other to form a spirocycloalkane group or a lower alkyl spirocycloalkane group including the 2-carbon atom of the triazine ring, the spirocycloalkane group having five – seven carbon atoms,
and acid addition salts thereof.

Preferably Ar is a substituted benzene ring.

In one preferred group of compounds of the invention Ar may be substituted by a single alkoxy group and by a single halogen atom. The alkoxy group conveniently contains one – six carbon atoms and the halogen is chlorine or bromine.

In an especially preferred group of compounds Ar is benzene with an alkoxy group in the 2-position and a halogen atom in the 5-position.

In another preferred group of compounds of the invention Ar may be substituted by a single halogenoloweralkyl group. The lower alkyl group may be straight chain or branched and may be substituted by one or more halogen atoms. A preferred group is the trifluoromethyl group.

The groups $R_1$ and $R_2$ are conveniently both methyl.

Other substituents may also be present, for example nitro or loweralkoxy carbonyl groups, the lower alkoxy part having one – six carbon atoms.

Although formulas have been used herein in order to represent the compounds of the present invention, the nature and value of the present invention does not depend upon the precise theoretical correctness of these formulas. The names and formulas used herein are not intended to limit the invention to any specific tautomeric form or to any specific optical or geometric isomer.

Structures of the following form may for example contribute towards Formula I

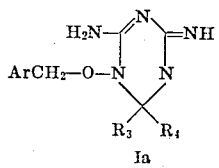  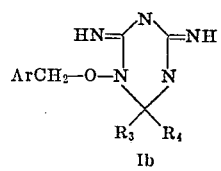

The compounds of the present invention are conveniently prepared in the form of the mono-basic acid addition salts, since the free base tends to be somewhat unstable, and a wide range of acids may be used. If the compounds are to be applied pharmaceutically, then the acid should of course have acceptable pharmaceutical properties such as low toxicity.

Thus the compounds of the present invention may be made in the form of the monohydrohalic acid addition salts for example the hydrobromide or the hydrochloride. Other salts may be made however and may be desirable in order to modify the properties of the product such as its toxicity, taste or physical form. For example the compounds may be made in the form of the picrate, saccharinate, acetate, acid maleate, acid phthalate, succinate, phosphate, p-nitrobenzoate, stearate, mandelate, N-acetylglycinate, pamoate, cyclamate, citrate, tartrate, cyclohexylsulphamate or gluconate.

The presence of the amino groups on the triazine ring of formula I creates the possibility of forming acyl derivatives by reaction with acylating agents for example acyl halides and anhydrides. One to four acetyl groups for example may be associated with the compound of Formula I. The present invention therefore includes compounds of Formula I in the form of acyl derivatives (e.g., an acetyl derivative).

Compounds within the scope of the present invention have activity against bacteria, parasites, including the Plasmodia of malaria, fungi including dermatophytes and Candida.

Thus activity has been observed against *Staph. aureus, Esch. coli, Candida albicans, Prot. mirabilis, Pseudomonas pycyanea, Strep. haemolyticus.*

For example 4,6-diamino-1,2-dihydro-2,2-dimethyl-1-(2-n-butoxy-5-bromobenzyloxy)-1,3,5-triazine hydrochloride of formula

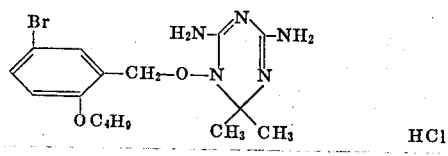

and its 3-trifluoromethylbenzyloxy analogue display activity against *Plasmodium berghei* in the mouse.

The present invention also provides a process for the preparation of the compounds of the present invention which comprises reacting a diguanide of general formula

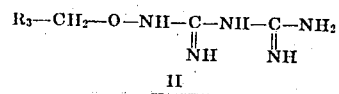

with a carbonyl compound of general formula

in the presence of an acid where $R_3$ is Ar or a group capable of conversion thereto and converting $R_3$ where necessary into Ar and optionally forming a salt or acyl derivative. Preferably the acid is a strong acid for example hydrochloric or formic.

The reaction may in some cases be carried out without any further solvents or diluents, but usually an inert solvent, such as a lower aliphatic alcohol, (e.g., methanol), is preferred. Preferably at least one molecular equivalent of acid is used.

If $R_3$ is Ar the desired product is obtained in one stage.

Alternatively, the group $R_3$ may be chosen so as to be convertible into the group Ar. For example $R_3CH_2$ may be a group $R_4$ which is subjected to catalytic hydrogenolysis after the formation of an $R_4ON-$ substituted triazine to produce the hydroxy triazine III

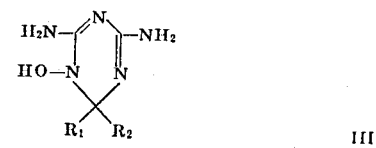

R₄ may for example be substituted or unsubstituted benzyl or substituted or unsubstituted naphthylmethyl, and the hydrogenolysis may be carried out with hydrogen in the presence of a palladium catalyst.

The hydroxytriazine III may then be reacted in a variety of ways well understood by those skilled in the art to produce the desired substituted triazine of Formula I.

Thus well-known ether-forming synthetic methods may be used to link the side-chain to the triazine with the O atom previously in place on either. Typical examples are 1. the reaction of a halide with a hydroxyl compound with or without added base
2. the reaction of a reactive ester such as a sulphonate with a hydroxyl compound.

The final product will usually be obtained in the form of an acid addition salt as a consequence of the reaction but if necessary the additional step of reacting the free base with an acid to form a salt may be performed. Salts can be converted back to the free base by treatment with alkali (e.g., KOH) and then converted to other salts as required by conventional means.

A further aspect of the present invention provides a process for the preparation of the compounds of the present invention which comprises reacting a triazine

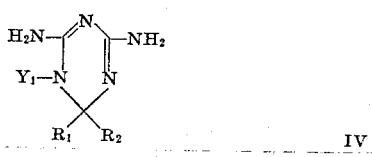

IV where $Y_1$ is a reactive group with a compound $R_5Y_2$ where $R_5Y_2$ is a group capable of reacting with $Y_1$ so as to convert $Y_1$ into Ar $CH_2O-$ or into a group capable of conversion into Ar $CH_2O-$.

Preferably $Y_2$ and $Y_1$ are OH or derivatives of OH capable of reacting with each other to form an oxygen linkage. Thus $Y_2$ and $Y_1$ should have at least one oxygen atom between them. Conveniently $Y_1$ is OH or OM where M is an alkali metal and $Y_2$ is chlorine, bromine or iodine. Other reactive derivatives of the OH group include sulphonic acid derivatives.

In a preferred process a compound Ar $CH_2Z$ where Z is chlorine or bromine is reacted with the hydroxy triazine III in an inert solvent or diluent. Examples of suitable solvents include dimethyl sulphoxide, dimethylformamide or ethanol.

The hydroxy triazine derivative III is usually obtained in the form of an acid addition salt (e.g., the hydrochloride) from which the free base may be liberated by one equivalent of base such as an alkali metal hydroxide (e.g., potassium hydroxide) or sodium in ethanol or methanol. The mixture may then be evaporated and reacted in a suitable solvent (e.g., dimethylformamide or dimethylsulphoxide). Preferably extra base is not added, since with two equivalents of sodium in alcohol for example a less pure product is obtained.

In a modified procedure, usually giving poorer yields, the hydrochloride of compound III in dimethyl formamide or dimethylsulphoxide is reacted with one equivalent of aqueous potassium hydroxide (using as little water as possible) and the resulting mixture reacted to give a triazine hydrohalide.

The $Y_1$ N—substituted triazine IV may be made from an appropriately substituted diguanide as outlined above or otherwise.

The present invention also provides pharmaceutical compositions for use against malaria comprising as active ingredient a compound according to the present invention together with a pharmaceutically acceptable carrier.

Thus the active compounds of this invention may be employed for the treatment of malaria. Therefore, one aspect of the present invention is a method of treatment of malaria which comprises administering one of the active compounds. The compound may be administered orally, parenterally or by suppository, though the oral route is preferred.

The dose of the compound needed will, of course, depend on the particular salt form used, the route of presentation and whether the compound is being used as a prophylactic or as a therapeutic dose to give clinical or radical cure of the disease.

As stated above the compound of this invention may be administered orally, parenterally or by suppository. The water solubility of the hydrochloride of the compound and most other salts is low and the hydrochloride is non-hygroscopic. If solutions are required it will be necessary to add solubilizing agents to the water, choose non-aqueous solvents, find a more soluble salt or prepare very dilute solutions.

Oral formulations are preferred and with the above proviso in connection with solutions, typical oral formulations will include tablets, pills, capsules, sachets, granules, powders, chewing gum, suspensions, emulsions and solutions: particularly preferred oral formulations are tablets and capsules. Where appropriate and where necessary the formulations may include diluents, binding agents, dispersing agents, surface-active agents, lubricating agents, coating materials, flavoring agents, coloring agents, solvents, thickening agents, suspending agents, sweeteners or any other pharmaceutically acceptable additives, for example gelatin, lactose, starch, talc, magnesium stearate, hydrogenated oils, polyglycols and syrups. Where the formulations are tablets or capsules and the like they will represent pre-measured unit doses but in the case of granules, powders, suspensions and the like the formulations may be presented as pre-measured unit doses or in multi-dose containers from which the appropriate unit dose may be withdrawn.

The injectable form may be an aqueous or non-aqueous solution, suspension, or emulsion in a pharmaceutically acceptable liquid (e.g., sterile pyrogen-free water or parenterally acceptable oils) or mixture of liquids which may contain bacteriostatic agents, antioxidants or other preservatives, buffers (preferably in the physiological pH range of 6.5 – 7.0), solutes to render the solution isotonic with the blood, thickening agents, suspending agents or other pharmaceutically acceptable additives. Such forms will be presented in unit dose form such as ampules or disposable injection devices, or in multi-dose forms such as a bottle from which the appropriate dose may be withdrawn, or as a solid form or concentrate which can be used to quickly prepare an injectable formulation. All formulations for injections are preferably rendered sterile. Suppositories containing the compound will also contain suitable carriers, (e.g., cocoa butter or polyglycols).

In addition to standard pharmaceutical additives, there may be included within formulations of the compound other therapeutic agents, particularly including other antimalarials (e.g., sulphonamides).

Insofar as the formulations of the present invention are novel this invention also provides a method of producing them.

Examples of the invention will now be described.

EXAMPLE 1

4,6-Diamino-1,2-dihydro-2,2-dimethyl-1-(2-n-butoxy-5-bromobenzyloxy)-1,3,5-triazine hydrochloride p-Bromo-n-butoxybenzene (22.9 g.) paraformaldehyde (5g.), anhydrous $EnCl_2$ (5 g.) all dissolved in dry $CHCl_3$ (50 ml.), were treated with dry KCl gas for 1 hour at 40° – 50° C. The mixture was then stirred at this temperature for 3 hours. The reaction mixture was washed with water, dried and the solvent evaporated. The residue was distilled at 0.05 mm. and the fraction boiling at 110° – 114° C collected and identified as 2-n-butoxy-5-bromobenzyl chloride (9.2 g. $n_D^{20}$ 1.5520, Lt. 1.5546).

4,6-Diamino-1,2-dihydro-2,2-dimethyl-1-hydroxy-1,3,5-triazine hydrochloride (6.27 g.) was dissolved in MeOH (50 ml.) and a solution of KOH (2.14 g.) in NeOH (50 ml.) added. The mixture was refluxed for 20 minutes, and the solvent removed "in vacuo." The residual solid was suspended in DMF and the 2-n-butoxy-5-bromobenzyl chloride (9.0 g.) added. The mixture was stirred at room temperature for 16 hours, the precipitated inorganic solid was removed by filtration and the solvent evaporated under vacuum.

The residue was triturated with acetone to give a white solid, which was washed with water and dried, 11.7 g. m.p. 207° – 209°. A small amount was recrystallized from Ethanol/Ether, m.p. 208° – 210°. The analysis was correct for 4,6-diamino-1,2-dihydro-2,2-dimethyl-1-(2-n-butoxy-5-bromobenzyloxy)-1,3,5-triazine hydrochloride.

EXAMPLE 2

4,6-Diamino-1,2-dihydro-2,2-dimethyl-1-(2-ethoxy-5-chlorobenzyloxy)-1,3,5-triazine hydrochloride 2-Ethoxy-5-chlorobenzyl chloride was prepared from 4-ethoxychlorobenzene in the same manner as described above. $n_D^{23}$ 1.5560.

The 2-ethoxy-5-chlorobenzyl chloride (8.2 g.) was reacted with the base prepared from 4,6-diamino-1,2-dihydro-2,2-dimethyl-1-hydroxy-1,3,5-triazine hydrochloride (7.74 g.) and KOH (2.64 g.). The reaction afforded 5.35 g. white solid m.p. 190° – 195°.

After recrystallization from ethanol/ether 4.77 g. of 4,6-diamino-1,2-dihydro-2,2-dimethyl-1-(2-ethoxy-5-chlorobenzyloxy)-1,3,5-triazine hydrochloride m.p. 205° – 208° was obtained.

EXAMPLES 3 – 7

The compounds were in the form of the hydrochloride in all examples, and were made by processes closely similar to those described in Examples 1 and 2.

FORMULA I

| Example Number | Ar | $R_1$ | $R_2$ | m.p.°C |
|---|---|---|---|---|
| 3 | 2-methoxy-5-bromophenyl | —(CH$_2$)$_5$— | | 214–216 |
| 4 | 2-ethoxy-5-bromophenyl | CH$_3$ | CH$_3$ | 214–216 |
| 5 | 2-ethoxy-5-bromophenyl | —(CH$_2$)$_5$— | | 193 |
| 6 | 2-n-propyloxy-5-bromophenyl | CH$_3$ | CH$_3$ | 208–210 |
| 7 | 2-methoxy-5-bromophenyl | CH$_3$ | CH$_3$ | 218–220 |

EXAMPLE 8

4,6-Diamino-1,2-dihydro-2,2-dimethyl-1(3-trifluoromethyl-benzyloxy)-1,3,5-triazine hydrochloride A mixture of 4,6-diamino-1,2-dihydro-2,2-dimethyl-1-hydroxy-1,3,5-triazine hydrochloride (3.87 g.) in methanol (60 ml.) containing 1.4 g. potassium hydroxide was refluxed for 20 minutes and then evaporated under vacuum. The residual solid, suspended in 50 ml. dimethylformamide, was treated with 3.8 g. m-trifluoromethylbenzyl chloride and stirred for 24 hours at room temperature. The mixture was filtered and the filtrate evaporated to give 3.77 g. solid, m.p. 198° – 200° after washing with acetone. Washing with water and crystallization of the insoluble material from ethanol gave 2.1 g. 4,6-diamino-1,2-dihydro-2,2-dimethyl-1-(3-trifluoromethylbenzyloxy)-1,3,5-triazine hydrochloride, m.p. 204° – 205°.

EXAMPLE 9

Tablets of 4,6-diamino-1,2-dihydro-2,2-dimethyl-1-(2-n-butoxy-5-bromobenzyloxy)-1,3,5-triazine hydrochloride One tablet contains 10 mg. of active ingredient.

Formulation for production of 100,000 tablets (approximately 15 kg.)

| | |
|---|---|
| Active ingredient | 1,000 grams |
| Maize starch (6–9% moisture limit) | 1,500 grams |
| Gum. Acacia powder | 500 grams |
| Lactose | 8,000 grams |
| Icing Sugar | 4,500 grams |
| Talc | 200 grams |
| Magnesium stearate | 100 grams |
| Liquid paraffin | 15 grams |
| Water | approx. 1 liter |
| N.B. Theoretical yield | 100,000 tablets |

METHOD

1. Granulation
   1. Dry starch in a hot air oven at 40° C until moisture is reduced to limit of 6 – 9 percent w/w.
   2. Sieve each of the powders separately through a 40 mesh sieve.
   3. Place the active ingredient in a planetary mixer and gradually add the lactose with continual stirring.
   4. Add the icing sugar, starch and acacia, mixing for about 5 minutes after each addition, continue to mix for a further 20 minutes.
   5. With constant mixing, add sufficient water until a suitable granule consistency is obtained (approximately 1 liter).
   6. Pass damp granules through a rotary granulator fitted with a 10 mesh screen.
   7. Dry the granules on trays at approximately 50° C.
2. Compression mixture
   1. Pass the dried granules through a 16 mesh screen.
   2. Sieve sufficient dried granules on a 40 mesh sieve to obtain approximately 500 grams of fines.
   3. Mix the liquid paraffin with the fines and pass through a 20 mesh sieve.
   4. Pass the talc and magnesium stearate through a 20 mesh sieve.
   5. To the bulk of the granules in a planetary mixer add the lubricated fines, followed by the talc and magnesium stearate. Mix thoroughly for at least 10 minutes after each addition, and finally for 20 minutes.
3. Tabletting Compress the tablets on a rotary machine using specified punches and limits of thickness.

Check weight of tablets — 10 tablets weigh 1.5 gms.

N.B. Coating

Tablets can be spray coated with specified film coating lacquer.

I claim:

1. A compound selected from the group consisting of a substituted triazine of the formula:

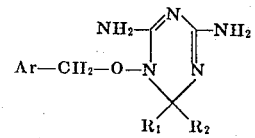

where

Ar is:
  phenyl substituted by one or two alkoxy groups of one – 24 carbon atoms and one to three halogen atoms or phenyl substituted by one or two halogenoloweralkyl groups of one – six carbon atoms, $R_1$ is:
  hydrogen or lower alkyl of one – four carbon atoms, $R_2$ is:
  lower alkyl of one – four carbon atoms where $R_1$ and $R_2$ are individually the same or different or together joined to each other to form a spirocycloalkane group or a lower alkyl spirocycloalkane group including the 2-carbon atom of the triazine ring, the spirocycloalkane group having five – seven carbon atoms, an acid salt thereof or an acid addition salt thereof.

2. A compound selected from the group consisting of a substituted triazine of the formula:

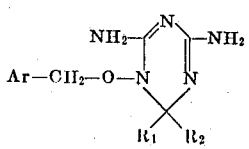

where
- Ar is: phenyl substituted by alkoxy of one – 24 carbon atoms and halogen,
- $R_1$ is: hydrogen or lower alkyl of one – four carbon atoms,
- $R_2$ is: lower alkyl of one – four carbon atoms where $R_1$ and $R_2$ are individually the same or different or together joined to each other to form a spirocycloalkane group or a lower alkyl spirocycloalkane group including the 2-carbon atom of the triazine ring, the spirocycloalkane group having five – seven carbon atoms, and a pharmaceutically acceptable acid addition salt thereof.

3. A compound as claimed in claim 2 in which Ar is benzene substituted by a lower alkoxy group of one – six carbon atoms and by a halogen atom.

4. A compound as claimed in claim 3 in which Ar is 2-alkoxy-5-halogenophenyl.

5. A compound selected from the group consisting of 4,6-diamino-1,2-dihydro-2,2-dimethyl-1-(2-n-butoxy-5-bromobenzyloxy)-1,3,5-triazine and a pharmaceutically acceptable salt thereof.

6. A compound as claimed in claim 1 in which Ar is benzene substituted by a single halogenoloweralkyl group.

7. A compound as claimed in claim 6 in which Ar is benzene substituted by a trifluoromethyl group.

8. A compound as claimed in claim 7 in which Ar is 3-trifluoromethylphenyl.

9. A compound as claimed in claim 1 in the form of an acetyl derivative.

* * * * *